United States Patent
Matiash et al.

(10) Patent No.: US 9,517,522 B2
(45) Date of Patent: Dec. 13, 2016

(54) SELF-ALIGNING WIRE FEEDER ASSEMBLY

(75) Inventors: Nicholas A. Matiash, Oshkosh, WI (US); Michael A. Sammons, Appleton, WI (US)

(73) Assignee: Illinois Tool Works Inc., Glenview, IL (US)

( * ) Notice: Subject to any disclaimer, the term of this patent is extended or adjusted under 35 U.S.C. 154(b) by 820 days.

(21) Appl. No.: 13/604,044

(22) Filed: Sep. 5, 2012

(65) Prior Publication Data
US 2014/0061277 A1 Mar. 6, 2014

(51) Int. Cl.
*B23K 9/133* (2006.01)
*B65H 51/04* (2006.01)
*B65H 57/26* (2006.01)

(52) U.S. Cl.
CPC ............ *B23K 9/1336* (2013.01); *B23K 9/133* (2013.01); *B65H 51/04* (2013.01); *B65H 57/26* (2013.01)

(58) Field of Classification Search
CPC ....... B23K 9/133; B23K 9/1336; B65H 51/02; B65H 51/04; B65H 57/26
See application file for complete search history.

(56) References Cited

U.S. PATENT DOCUMENTS

| | | |
|---|---|---|
| 2,272,158 A | 2/1942 | Anderson |
| 2,754,958 A | 7/1956 | Murrell et al. |
| 2,904,168 A | 9/1959 | Wall et al. |
| 2,906,913 A | 9/1959 | Catlett |
| 3,016,451 A | 1/1962 | Cornell, Jr. |
| 3,026,012 A | 3/1962 | Clay |
| 3,046,438 A | 7/1962 | Elseth |
| 3,279,669 A | 10/1966 | Bernard et al. |
| 3,331,545 A | 7/1967 | Olivieri |
| 3,344,305 A | 9/1967 | Ogden |
| 3,430,832 A | 3/1969 | Meyer |
| 3,447,305 A | 6/1969 | Stahlecker et al. |
| 3,447,730 A | 6/1969 | Jeannette |

(Continued)

FOREIGN PATENT DOCUMENTS

| | | |
|---|---|---|
| DE | 29920227 | 1/2000 |
| EP | 1206993 | 5/2002 |

(Continued)

OTHER PUBLICATIONS

Miller Electric Mfg. Co., S-52A, S-54A Owner's Manual, Oct. 1991, 40 pgs., USA. cited by other.

(Continued)

*Primary Examiner* — William E Dondero
(74) *Attorney, Agent, or Firm* — George R. Corrigan

(57) ABSTRACT

A wire feeder comprises a motor and drive roll assembly. The motor and drive roll assembly comprises a base assembly having a left hand side and a right hand side. A first locating mechanism is on the right hand side and a second locating mechanism is on the left hand side. Modules, such as inlet or outlet guides can be located and mounted, preferably on either side. Each module preferably includes an additional locating mechanism to allow an additional module to be located by the additional locating mechanism. The locating mechanisms are preferably of the same design, and preferably each includes at least two holes with a locator pin disposed in each hole, and each module being located includes at least locating holes to receive the locator pins.

14 Claims, 4 Drawing Sheets

(56) References Cited

U.S. PATENT DOCUMENTS

| | | |
|---|---|---|
| 3,447,832 A | 6/1969 | Shaw |
| 3,629,547 A | 12/1971 | Kester et al. |
| 3,675,837 A | 7/1972 | Gerould |
| 3,847,287 A | 11/1974 | Dinse |
| 3,901,425 A | 8/1975 | Taylor et al. |
| 4,068,106 A | 1/1978 | Shaputis |
| 4,143,257 A | 3/1979 | Herrmann |
| 4,160,151 A | 7/1979 | Tonita |
| 4,165,829 A | 8/1979 | Koveshnikov et al. |
| 4,177,912 A | 12/1979 | Samokovliski et al. |
| 4,206,862 A | 6/1980 | DaCosta |
| 4,210,796 A | 7/1980 | Moerke |
| 4,261,499 A | 4/1981 | Samokovliski et al. |
| 4,261,500 A | 4/1981 | Samokovliski et al. |
| 4,344,553 A | 8/1982 | Lesher et al. |
| 4,429,820 A | 2/1984 | Angelov et al. |
| 4,442,334 A | 4/1984 | Lux et al. |
| 4,549,068 A | 10/1985 | Kensrue |
| 4,600,824 A | 7/1986 | Moerke |
| 4,650,959 A | 3/1987 | Swensrud et al. |
| 4,695,702 A | 9/1987 | Gartland |
| 4,845,336 A | 7/1989 | Samokovliiski et al. |
| 4,864,099 A | 9/1989 | Cusick, III et al. |
| 5,338,917 A | 8/1994 | Stuart et al. |
| 5,452,381 A | 9/1995 | Guerra |
| 5,738,264 A | 4/1998 | Jackson et al. |
| 5,816,466 A | 10/1998 | Seufer |
| 6,066,833 A | 5/2000 | Rigdon et al. |
| 6,257,517 B1 | 7/2001 | Babish et al. |
| 6,318,614 B1 | 11/2001 | Boyd |
| 6,365,867 B1 | 4/2002 | Hooper |
| 6,388,234 B1 | 5/2002 | Collins et al. |
| 6,427,894 B1 | 8/2002 | Blank et al. |
| 6,525,297 B2 | 2/2003 | Doherty |
| 6,536,644 B2 | 3/2003 | Plow |
| 6,557,742 B1 | 5/2003 | Bobeczko et al. |
| 6,568,578 B1 | 5/2003 | Kensrue |
| 6,903,305 B2 | 6/2005 | Mukai et al. |
| 7,026,574 B2 | 4/2006 | Belfiore et al. |
| 7,374,074 B2 | 5/2008 | Matiash |
| 7,390,989 B2 | 6/2008 | Matiash et al. |
| 7,615,723 B2 | 11/2009 | Matiash |
| 2005/0006425 A1 | 1/2005 | Enyedy |
| 2005/0224482 A1 | 10/2005 | Matiash |
| 2012/0125905 A1* | 5/2012 | Anzengruber et al. .. 219/137.63 |
| 2012/0152926 A1 | 6/2012 | Matiash et al. |

FOREIGN PATENT DOCUMENTS

| | | |
|---|---|---|
| FR | 2548096 | 7/1983 |
| GB | 2183431 | 6/1987 |
| JP | H1043860 | 2/1998 |
| WO | 01/66297 | 9/2001 |
| WO | 0172460 | 10/2001 |
| WO | WO 2010127377 A1 * | 11/2010 |

OTHER PUBLICATIONS

Miller Electric Mfg. Co., 22A, 24A Owner's Manual, Oct. 2003, 28 pgs., USA. cited by other.

Miller Electric Mfg. Co., S-74DX Owner's Manual, Nov. 2003, 40 pgs., USA. cited by other.

International Search Report, PCT/US2013/057889, Jan. 8, 2014, European Patent Office, Rijswijk, Netherlands.

* cited by examiner

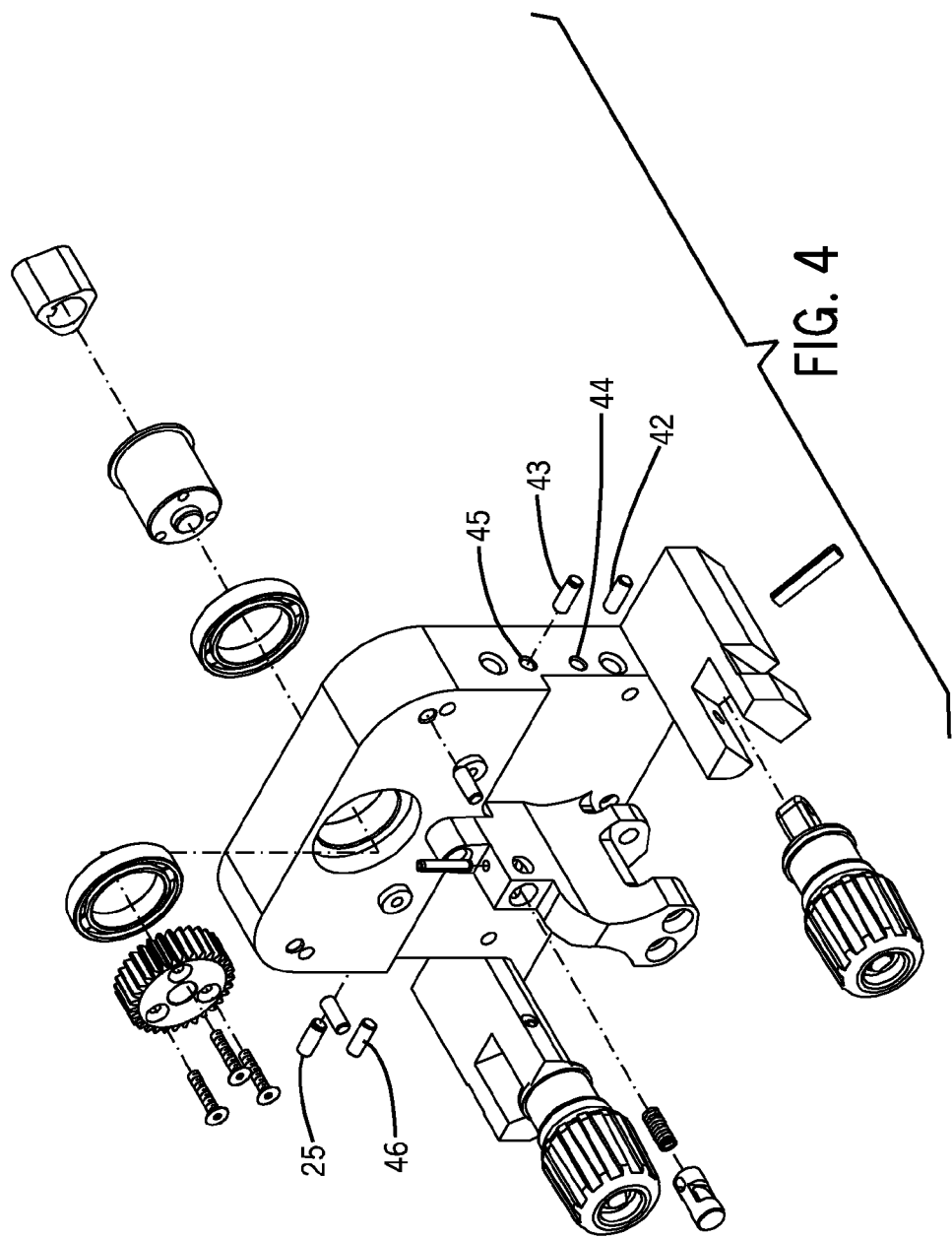

SELF-ALIGNING WIRE FEEDER ASSEMBLY

FIELD OF THE INVENTION

The present invention relates generally to the art of wire feeders used for welding. More specifically, it relates to a wire feeder used for welding comprised of self aligning and/or common and/or reversible components.

BACKGROUND OF THE INVENTION

Some welding processes consume wire as they are carried out. Wire feeders provide wire to a welding gun, which feeds the wire to the arc. Power can be applied to the wire at the feeder, or at the gun. Wire feeders typically have a replaceable spool of wire or bulk wire delivery system from which the wire being fed to the arc is unwound. One or more drive rolls grip the wire and pull the wire from the supply, pushing it through a conduit to the gun and the arc. Some wire feeders feed the wire at a constant feed rate, but other wire feeders can vary the feed rate in response to the arc length and voltage.

The motor and drive roll assembly used in a wire feeder can be designed so that the wire is fed from left-to-right, or from right-to-left. Whether a left-to-right or a right-to-left design is desired depends on the particular wire feeder in which the assembly is to be used. Generally, the block that receives wire from the spool is different from the block that feeds the wire to the welding gun. Moreover, these parts or blocks typically are mounted in different manners. Some prior art provided for input/output blocks to be reversible about a vertical axis (i.e, the assembly needs to be reversed top to bottom), and others allowed for the motor to be reversed (relative to the drive roll assembly). However, the prior art did not provide for right/left reversibility, and thus required separate parts for left handed or right handed motor drive assemblies. Moreover, the prior art did not provide an easy way to locate the guides. Manufacturing motor and drive rolls assemblies would be easier and more flexible if the input and outputs of motor and drive rolls assemblies were right/left reversible so that the same part could be used for left and right handed motor drive assemblies.

It is known in the prior art to mount various components on the input or outputs of wire feeder. Each motor drive assembly typically includes the inlet guide and outlet guide blocks. But, there can also be, for example, a wire straightener, a wire sensor, a bulk conduit, or a wire type option. These options should be precisely located or positioned because the wire passes through them, and if the are not properly located the wire path through the option can be compromised. These options are not integral to the motor drive assembly and are difficult to mount in the desired location and with the desired precision. Also, the mounting may require them to be mounted in a particular order, or limit the mixing and matching of options. Thus, a motor and drive roll assembly able to have any component mounted in a desired location with a desired precision, and in any desired order, would be useful.

SUMMARY OF THE PRESENT INVENTION

According to a first aspect of the invention a wire feeder comprises a motor and drive roll assembly. The motor and drive roll assembly comprises a base assembly having a left hand side and a right hand side. A first locating mechanism is on the right hand side and a second locating mechanism is on the left hand side. An inlet guide can be located by both of the first and second locating mechanisms, and can be mounted on both of the right and left hand sides. An outlet guide is able to be located by both of the first and second locating mechanisms, and can be mounted on both of the right and left hand sides.

According to a second aspect of the invention a wire feeder comprises a motor and drive roll assembly. The motor and drive roll assembly comprises a base assembly having a left hand side and a right hand side, and a plurality of modules. A first locating mechanism is on the right hand side, and a second locating mechanism is on the left hand side. The plurality of modules are each able to be located by both of the first and second locating mechanisms, and each module can be mounted on both of the right and left hand sides.

According to a third aspect of the invention a wire feeder comprises a motor and drive roll assembly. The motor and drive roll assembly comprises a base assembly having a left hand side and a right hand side. A first locating mechanism is on one side and a second locating mechanism is on the other second side. An inlet guide is able to be located by the first locating mechanism, and can be mounted on the first side. An outlet guide is able to be located by the second locating mechanism, and can be mounted on the second side. A third locating mechanism is on either the inlet guide or the outlet guide. The locating mechanisms are of the same design.

According to a fourth aspect of the invention a wire feeder comprises a motor and drive roll assembly. The motor and drive roll assembly comprises a base assembly having a left hand side and a right hand side. A first locating mechanism is on one side and a second locating mechanism is on the other second side. A plurality of modules, each able to be located by at least one of the first and second locating mechanisms, can be mounted on one side or the other. Each module includes an additional locating mechanism to allow an additional module to be located by the additional locating mechanism.

One alternative provides for a third locating mechanism on the inlet guide and a fourth locating mechanism on the outlet guide. A third module can be located by both of the third and fourth locating mechanisms, and can be mounted to either the inlet guide and/or outlet guide. The third module includes a fifth locating mechanism.

Another alternative provides for each module to include an additional locating mechanism that allows an additional module to be located.

The locating mechanisms are of the same design in one embodiment.

The locating mechanisms each include at least two holes with a locator pin disposed in each hole, and each module being located includes at least locating holes to receive a locator pin in another embodiment.

A fourth locating mechanism is on the other of the inlet and outlet guides, and the locating mechanisms are of the same design in another embodiment.

Other principal features and advantages of the invention will become apparent to those skilled in the art upon review of the following drawings, the detailed description and the appended claims.

BRIEF DESCRIPTION OF THE DRAWINGS

FIG. 4 is a motor and drive roll assembly shown upside down and in accordance with the preferred embodiment.

Figure 1:
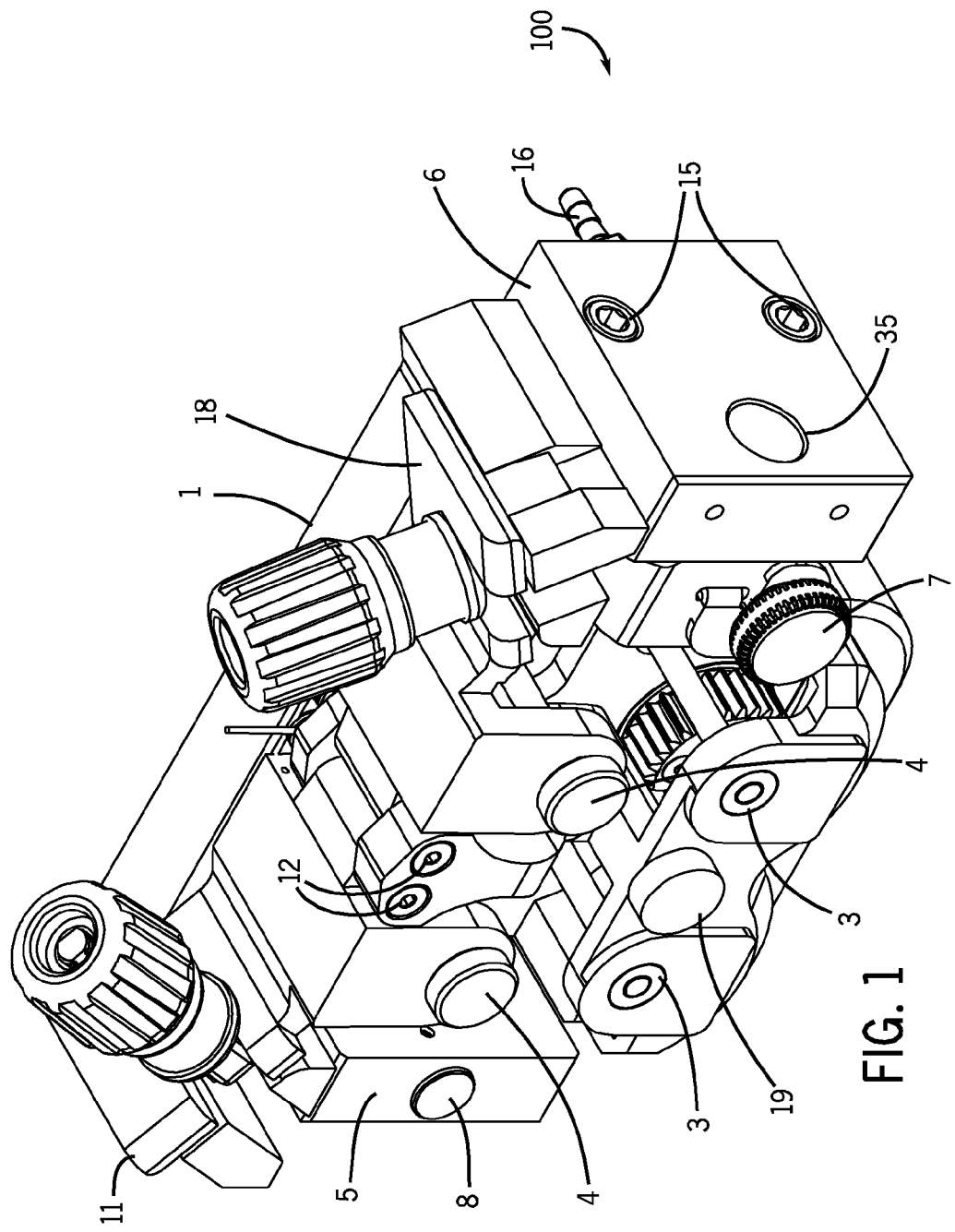
FIG. 1 is a wire feeder in accordance with the preferred embodiment.

Before explaining at least one embodiment of the invention in detail it is to be understood that the invention is not limited in its application to the details of construction and the arrangement of the components set forth in the following description or illustrated in the drawings. The invention is capable of other embodiments or of being practiced or carried out in various ways. Also, it is to be understood that the phraseology and terminology employed herein is for the purpose of description and should not be regarded as limiting. Like reference numerals are used to indicate like components.

DETAILED DESCRIPTION OF THE PREFERRED EMBODIMENTS

While the present invention will be illustrated with reference to a particular wire feeder assembly and particular components, it should be understood at the outset that the invention could be used with other wire feeders and with other components.

A wire feeder, in accordance with the preferred embodiment, includes a motor and drive roll assembly that is comprised of modular blocks or components that can be mixed or matched as desired. The modules are right/left reversible so that the component may be used on both right-to left motor and drive roll assemblies and left-to-right motor and drive roll assemblies. Motor and drive roll assembly, as used herein, includes the assembly on which the motor, drive rolls, guides, tension knobs, etc. are mounted, and can include the motor, drive rolls, guides, tension knobs, etc.

The preferred embodiment also provides for locating mechanisms that allow the modules to be easily located and mounted in the proper position. One embodiment provides that the locating mechanisms are stackable such that one module is mounted to the base assembly, a second is located and mounted to the first module, a third can be located and mounted to the second, etc.

Figure 2:
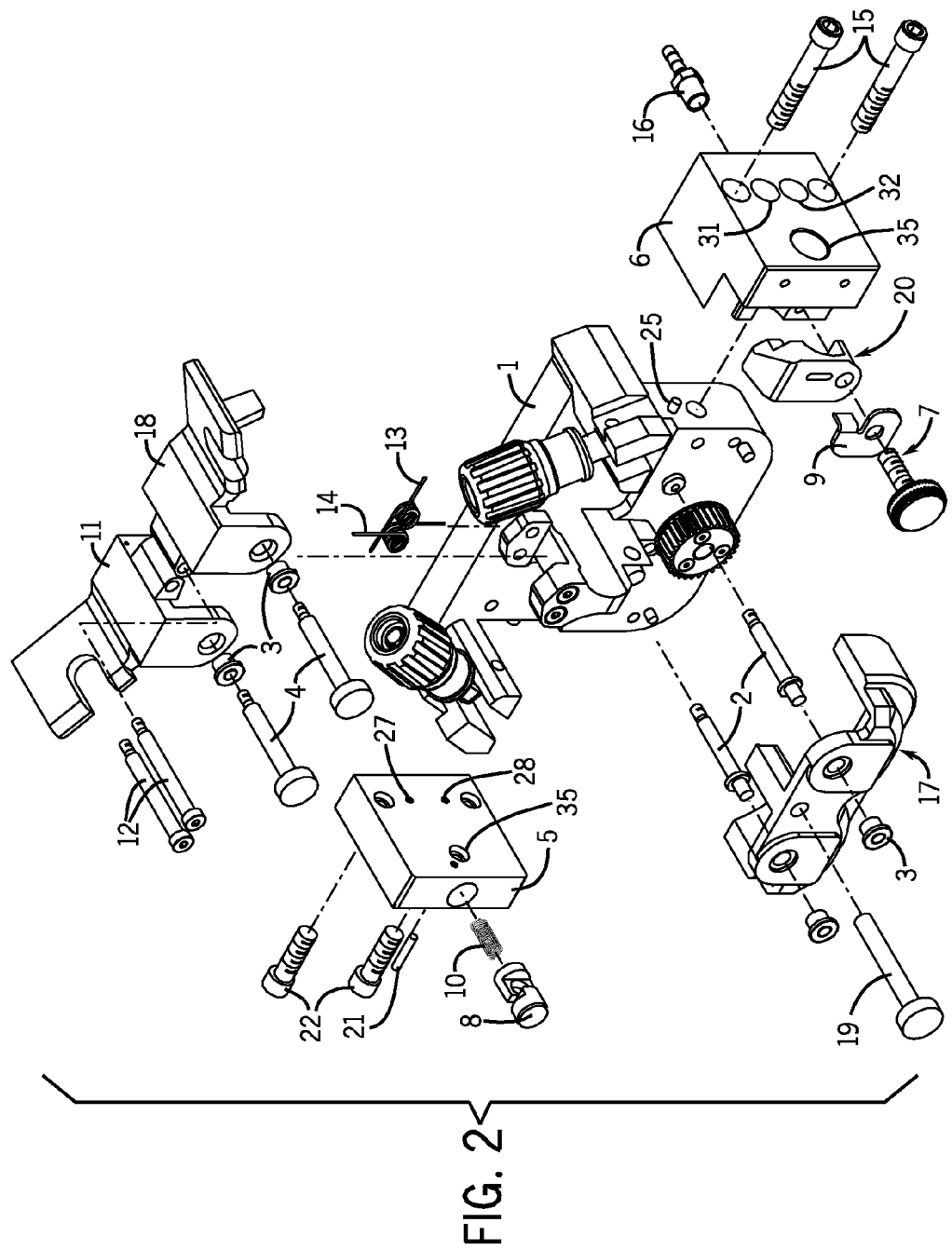
FIG. 2 is a motor and drive roll assembly in accordance with the preferred embodiment.
Figure 3:
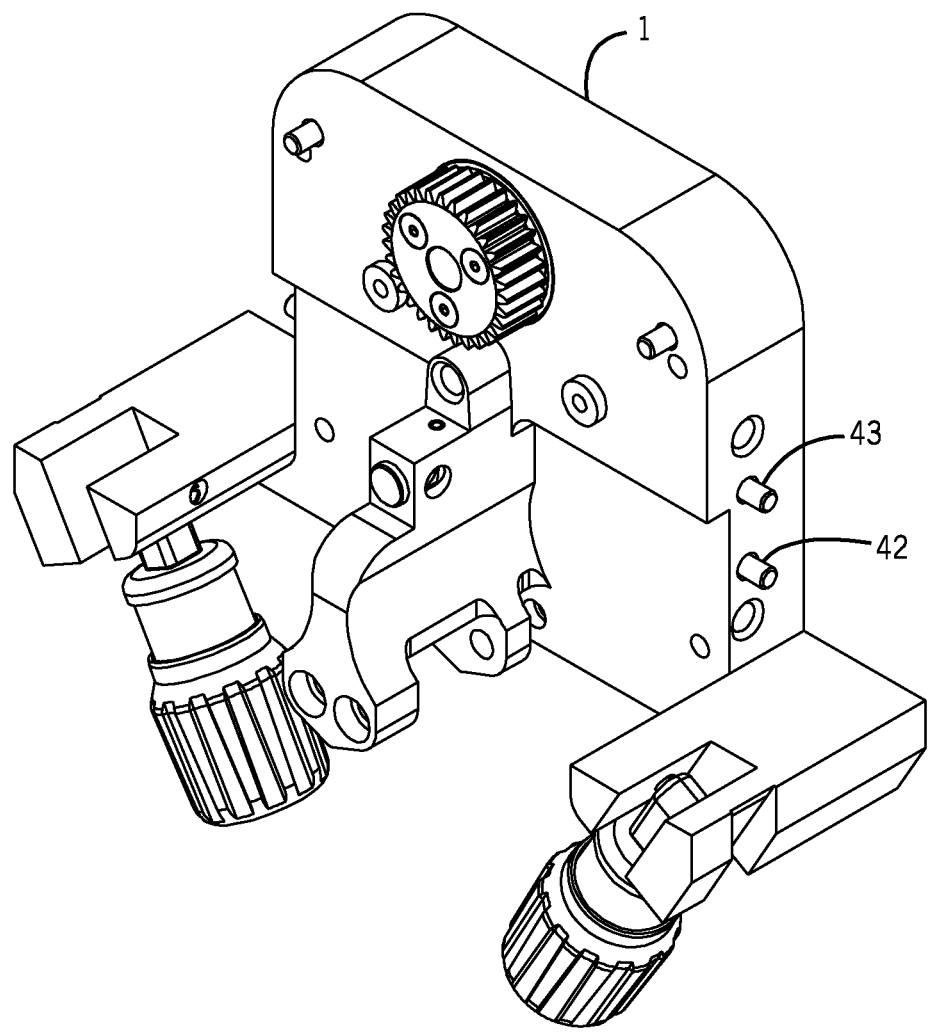
FIG. 3 is a motor and drive roll assembly shown upside down and in accordance with the preferred embodiment.

Referring now to FIGS. 1 and 2, a perspective view and an expanded perspective view, respectively, a motor and drive assembly 100 is shown. Portions of assembly 100 are shown in FIGS. 3 and 4. Motor and drive assembly 100 includes a base assembly 1, idler pins 2, flanges 3, drive roll shafts 4, an inlet guide block or module 5, an outlet block or module 6 (also called a power block when power is applied at the feeder), a power pin clamp knob 7, an inlet lock button 8, a power pin lock 9, a spring button 10, a left pressure or swing arm 11, shoulder screws 12, a pair of torsion springs 13 and 14, outlet socket head cap screws 15, a hose fitting 16, a shaft support cover 17, a right pressure or swing arm 18, a thumb screw 19, a power pin clamp 20, a slotted spring pin 21 and inlet screws 22. The wire passes through holes 35 in blocks 5 and 6. Much of assembly 100 is readily understood by one skilled in the art. Module, as used herein, is a functional module or component of a motor and drive assembly such as an inlet guide, outlet guide, wire senor, etc.

Base assembly 1 has the other components mounted thereon, and may be comprised of aluminum, plastic, or other material. Base assembly, of a motor and drive assembly, as used herein, includes the framework to which the inlet and outlet guides are mounted. A motor is mounted on the back of body assembly 100. Inlet block 5 is mounted on the left side of base assembly 1, and outlet block 6 is mounted to the right side of base assembly 1. Left hand side of a wire feeder or motor and drive roll assembly, as used herein, is the left side of the motor and drive roll assembly when viewing the motor and drive roll with the motor behind the motor and drive roll assembly. Right hand side of a wire feeder or motor and drive roll assembly, as used herein, is the right side of the motor and drive roll assembly when viewing the motor and drive roll with the motor behind the motor and drive roll assembly.

A locator pin 25 is shown in a locating hole on base assembly 1 (FIGS. 2 and 4). Pin 25 is received by a hole in outlet block 6 (which cannot be seen). A second hole (not shown) on base assembly 1 mates with a second pin 46 (FIG. 4) and a second hole in outlet block 6. Pin 25 and its corresponding hole, and the other hole and pin 46 (FIG. 4), cause outlet block 6 to be located precisely in the desired position for the wire path. The pair of holes in outlet block 6 and the corresponding pins are a locating mechanism to properly position outlet block 6. Locating mechanism as used herein, is the mechanism which properly locates a module on a motor and drive assembly with the precision desired when making the motor and drive assembly. One alternative provides for the locating mechanism to use screws with chamfered holes rather than pins. The taper of the back side of the screw head in the taper of the chamfered hole aligns the parts. Other locating mechanisms can also be used.

An identical arrangement of pins and holes is on the left side of assembly 1, and holes 27 and 28 on inlet block 5 can be seen. Pins 42 and 43, and holes 44 and 45 can be seen in FIG. 4. Holes 27 and 28 receive pins 42 and 43 (FIGS. 3 and 4). Thus, block 5 has a locating mechanism with the same design as the locating mechanism of block 6.

The left and right locating mechanisms of assembly 100, and modules 5 and 6 with the holes thereon, are designed such that modules 5 and 6 are left-right reversible (i.e., outlet module 6 may be mounted on the left and outlet module 5 may be mounted on the right). To do so module 5 is positioned on the right or left such the top of module 5 on the left is the bottom of module 5 on the right, and the front of module 5 is the same in the right and left sides. Likewise, module 6 is positioned such the top of module 6 on the right is the bottom of module 6 on the left, and the front of module 6 is the same in the right and left sides. Modules 5 and 6 are designed to be symmetric about a horizontal axis to allow them to be used on both the right and left sides. Other locating mechanisms could be used, such as fixed protrusions on either assembly 1 or modules 5 and 6, using only one hole/pin combination per side, with a flange or protrusion on assembly 1 or modules 5 and 6 preventing rotation, using more pin/hole combinations, etc.

Module 5 also includes inlet lock button 8, spring button 10 and slotted spring pin 21 which allow the user to lock the inlet guide. Module 6 also includes power pin clamp knob 7, power pin lock 9, and power pin clamp 20, because this embodiment is for a feeder having power applied at the feeder. Hose fitting 16 provides an inlet for welding gas. Blocks 5 and 6 are mounted under wire tensioner knobs.

Modules 5 and 6 are fixedly mounted to assembly 1 using cap screws 15 and screws 22. Additional modules may be stacked on to modules 5 and 6 using identical mounting mechanisms. Holes 31 and 32 in block 6 receive pins. The pins in holes 31 and 32 are received in holes on the additional modules. Cap screws 15 can longer, to extend through both modules, or cap screws 15 can have threaded caps that receive screws going through the additional module. The additional modules may perform any function, and be, for example, a wire feed speed sensor module, a wire straightener module, a bulk wire conduit connection module, a power pin clamp connection module, a special inlet guide such as a roller or damper for soft wire module, a wire cleaner module, a wire heater module, a wire distance counter module, a wire out sensor module, a wire type/material/size sensor module, a weld power connection module, and a gun connection module.

Pressure arms 11 and 18 are mounted to assembly 100 with shoulder screws 12, flanges 3, and drive roll shafts 4. Pressure arms 11 and 18 and the tensioner knobs, can function in accordance with the prior art.

Shaft support cover 17 covers the gears driven by the motor, and is mounted to assembly 1 and pressure arms 11 and 18 using idler pins 2, flanges 3, shafts 4, and thumb screw 19. Torsion spring 13 goes over bolt 12 after bolt 12 is inserted through arm 18. Spring 13 engages swing arm 18 and assembly 1, lifting arm 18 and holding it up when pressure is released from arm 11. Spring 14 has the same function for arm 11.

Alternatives include having an assembly with left-right reversible modules that are not stackable, or an assembly with stackable modules that are not left-right reversible, and having modules stackable on only one side.

Numerous modifications may be made to the present invention which still fall within the intended scope hereof. Thus, it should be apparent that there has been provided in accordance with the present invention a wire feeder assembly that fully satisfies the objectives and advantages set forth above. Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

The invention claimed is:

1. A wire feeder, comprising a motor and drive roll assembly, wherein the motor and drive roll assembly comprises:
   a base assembly having a left hand side and a right hand side;
   a first locating mechanism on the right hand side;
   a second locating mechanism on the left hand side;
   an inlet guide able to be located by both of the first and second locating mechanisms, and mountable on both of the right and left hand sides; and
   an outlet guide able to be located by both of the first and second locating mechanisms, and mountable on both of the right and left hand sides.

2. The wire feeder of claim 1, further comprising:
   a third locating mechanism on the inlet guide;
   a fourth locating mechanism on the outlet guide; and
   a third module able to be located by both of the third and fourth locating mechanisms, and wherein the third module is mountable to both of the inlet guide and outlet guide, and further wherein the third module includes a fifth locating mechanism.

3. The wire feeder of claim 2 wherein the first, second, third, fourth and fifth locating mechanisms are identical structurally.

4. The wire feeder of claim 1, wherein:
   the first and second locating mechanisms each include at least two holes with a locator pin disposed in each hole;
   the inlet guide has at least two inlet guide locating holes thereon, each disposed to receive a locator pin, whereby the inlet guide locating holes make the inlet guide able to be located by both of the first and second locating mechanisms; and
   the outlet guide has at least two outlet guide locating holes thereon, each disposed to receive a locator pin, whereby the outlet guide locating holes make the outlet guide able to be located by both of the first and second locating mechanisms.

5. A wire feeder, comprising a motor and drive roll assembly, wherein the motor and drive roll assembly comprises:
   a base assembly having a left hand side and a right hand side;
   a first locating mechanism on the right hand side;
   a second locating mechanism on the left hand side; and
   a plurality of modules, each able to be located by both of the first and second locating mechanisms, and each mountable on both of the right and left hand sides.

6. The wire feeder of claim 5, wherein each of the plurality of modules includes an additional locating mechanism to allow an additional module to be located by the additional locating mechanism.

7. The wire feeder of claim 6 wherein the first, second, and additional locating mechanisms are identical structurally.

8. The wire feeder of claim 6, wherein the first, second, and additional locating mechanisms are comprised of at least two holes with a locator pin disposed in each hole, and wherein the plurality of modules each has at least two locating holes thereon, each of the at least two locating holes disposed to receive a locator Pin.

9. A wire feeder, comprising a motor and drive roll assembly, wherein the motor and drive roll assembly comprises:
   a base assembly having a left hand side and a right hand side;
   a first locating mechanism on the right hand side;
   a second locating mechanism on the left hand side; and
   a plurality of modules, each able to be located by at least one of the first and second locating mechanisms, wherein each of the plurality of modules includes an additional locating mechanism to allow an additional module to be located by the additional locating mechanism.

10. The wire feeder of claim 9 wherein the first, second, and additional locating mechanisms are identical structurally.

11. The wire feeder of claim 10, wherein the first, second, and additional locating mechanisms are comprised of at least two holes with a locator pin disposed in each hole, and wherein the plurality of modules each has at least two locating holes thereon, each of the at least two locating holes disposed to receive a locator pin.

12. A wire feeder, comprising a motor and drive roll assembly, wherein the motor and drive roll assembly comprises:
   a base assembly having a left hand side and a right hand side;
   a first locating mechanism comprising one of a protrusion, flange and a recess on the right hand side;
   a second locating mechanism comprising the one of a protrusion, flange and a recess on the left hand side;
   an inlet guide able to be located by both of the first and second locating mechanisms, and mountable on both of the right and left hand sides; and an outlet guide able to be located by both of the first and second locating mechanisms, and mountable on both of the right and left hand sides.

13. The wire feeder of claim 12, further comprising:
a third locating mechanism comprising the one of a protrusion, flange and a recess on the inlet guide;
a fourth locating mechanism comprising the one of a protrusion, flange and a recess on the outlet guide; and
a third module able to be located by both of the third and fourth locating mechanisms, and wherein the third module is mountable to both of the inlet guide and outlet guide, and further wherein the third module includes a fifth locating mechanism comprising the one of a protrusion, flange and a recess.

14. The wire feeder of claim 13 wherein the first, second, third, fourth and fifth locating mechanisms are identical structurally.

\* \* \* \* \*